Feb. 18, 1941. F. B. STONE ET AL 2,232,038
ELECTRIC SPOT WELDING MACHINE
Filed Oct. 31, 1938 2 Sheets-Sheet 2
FIG. 2.
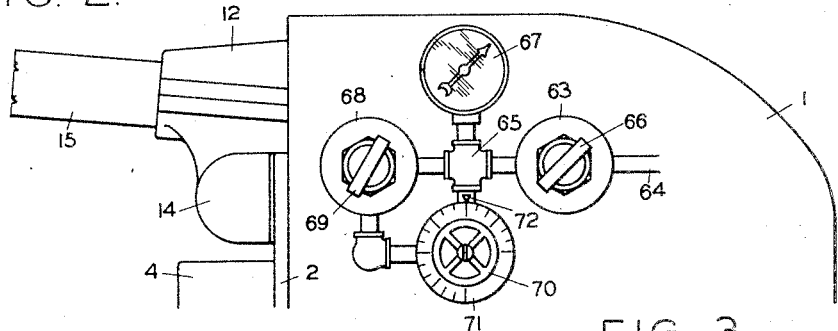
FIG. 5.
FIG. 3.
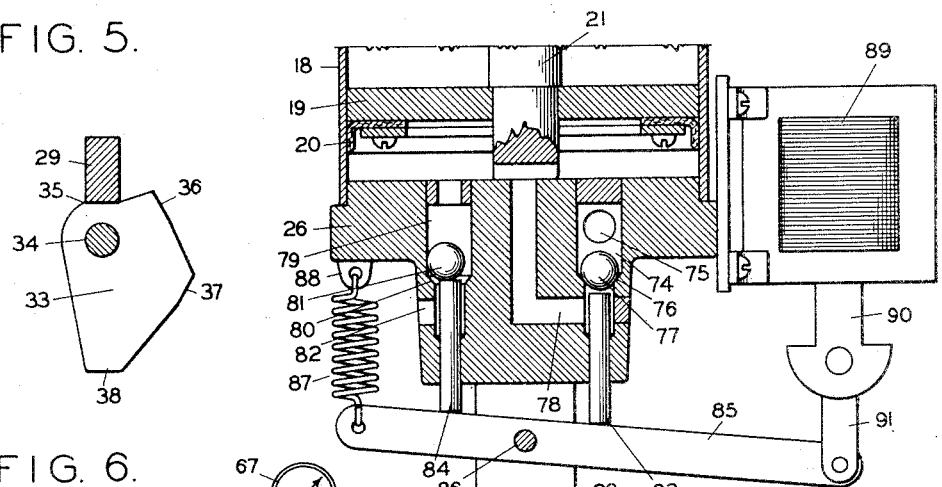
FIG. 6.
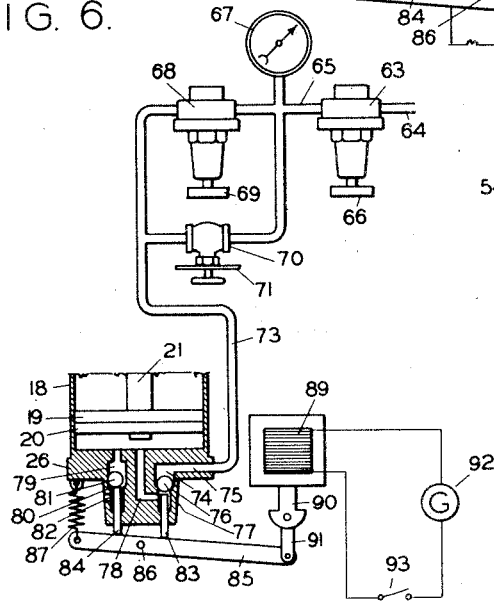
FIG. 4
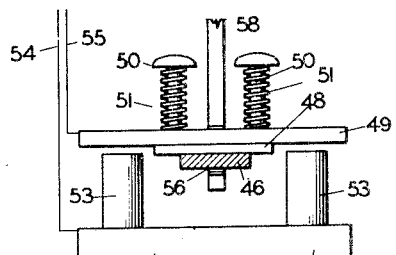
INVENTORS:
FLOYD B. STONE
HARRY C. STONE
BY Bradwell Yale
ATTORNEY Patented Feb. 18, 1941

2,232,038

UNITED STATES PATENT OFFICE 2,232,038

ELECTRIC SPOT WELDING MACHINE

Floyd B. Stone and Harry C. Stone, San Francisco, Calif., assignors to themselves and Kenneth M. Ryals, doing business as a partnership under the name of Stone-Ryals Electric and Manufacturing Co., San Francisco, Calif.

Application October 31, 1938, Serial No. 237,904

3 Claims. (Cl. 219—4)

This invention relates to improvements in electric spot welding machines and, more particularly, to welding machines operated by fluid pressure.

Among the objects of the invention is to provide means for varying the duration of the welding current without altering the time period required for the motion of the power operated means in clamping the work between the electrodes.

Another object is to enable the machine to be manually operable at the will of the operator without the necessity for disconnecting the fluid pressure power means or interfering with its adjustment.

Another object is to hold the work clamped between the electrodes until the control switch is released by the operator.

Another object is to increase the clamping pressure applied to the work being welded throughout the welding operation, so that the clamping pressure reaches a maximum maintained during the cooling and solidification of the weld after the flow of the welding current is cut off.

Another object is to provide a welding machine of the present type which is simple and rugged in construction and reliable in operation.

Other objects and advantages appear as this description progresses.

In this specification and the accompanying drawings, the invention is disclosed in its preferred form. It is to be understood, however, that it may be embodied in other forms within the purview of the claims following the description.

In the two sheets of drawings:

Fig. 2 is a fragmentary side elevation of the same showing the valves for regulating the power operating mechanism.

Fig. 3 is an enlarged vertical section of the lower portion of the power cylinder for operating the machine, showing the magnetic valve controlling the admission of fluid pressure to the power cylinder.

Fig. 4 is a transverse vertical section taken along the line IV—IV in Fig. 1 showing the switch contacts controlling the welding circuit.

Fig. 5 is a vertical section in somewhat reduced scale showing the means for adjusting the initial clearance between the electrodes.

Fig. 6 is a schematic diagram showing the control means for the power cylinder.

Figure 1:
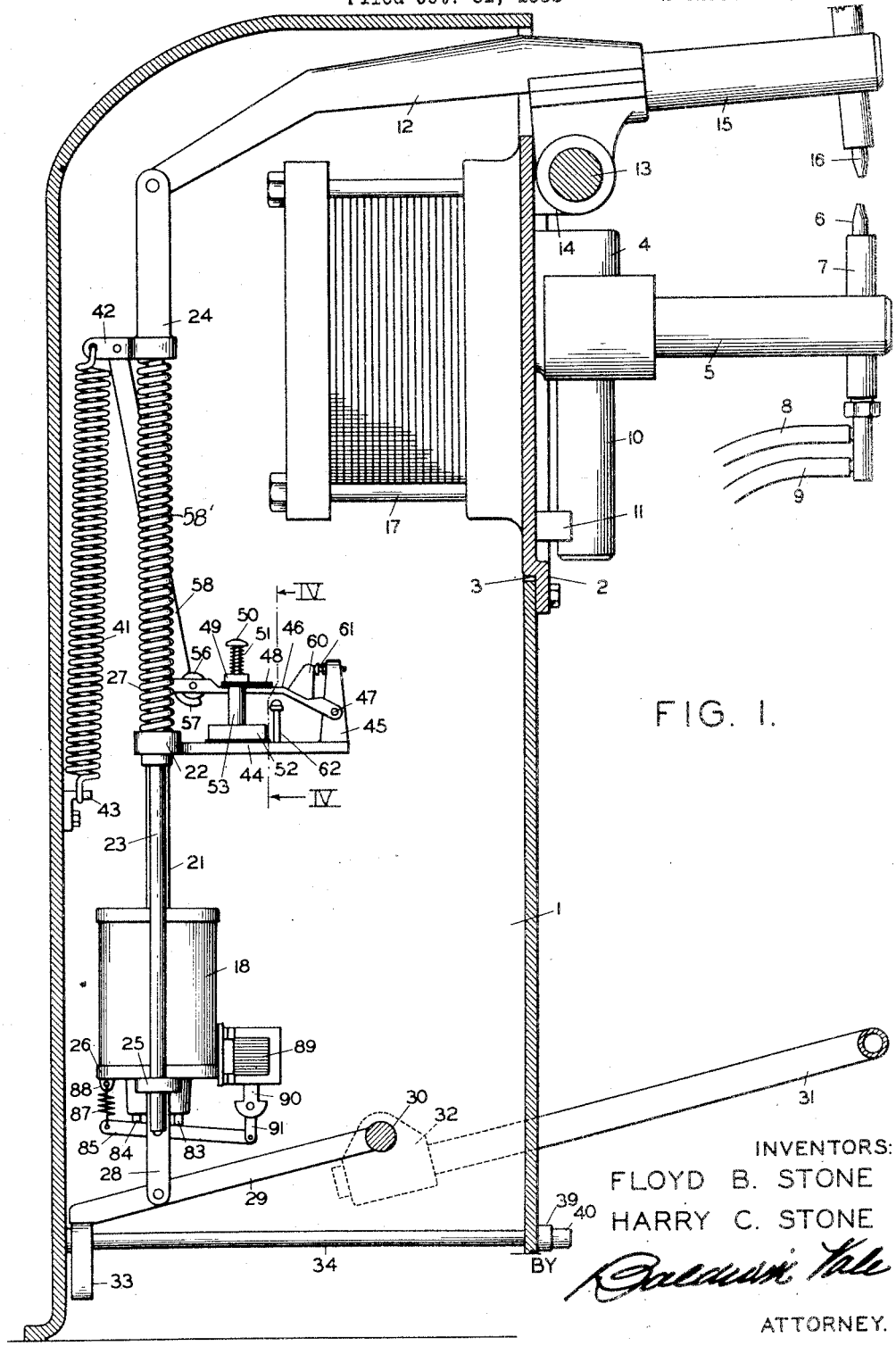
Fig. 1 is a vertical section of a welding machine constructed in accordance with this invention.

In detail, the construction illustrated in the drawings, referring more particularly to Fig. 1, comprises the enclosing pedestal casing 1 with the plate 2 bolted to its front over the opening 3. The bracket 4 is mounted on the plate 2 and is suitably insulated therefrom. The arm 5 extends laterally from the bracket 4 and has stationary electrode 6 mounted therein which is suitably water jacketed at 7. The hoses 8 and 9 connected to the water jacket 7 communicate with a water service line and a drain respectively. The foot 10 extends downwardly from the bracket 4 and bears against the pressure block 11 to support the electrode 6 against the clamping pressure exerted thereagainst.

The lever 12 is pivoted on the stub shaft 13 mounted in the yoke bracket 14 on the plate 2 and has the arm 15 extending laterally therefrom. The water-jacketed electrode 16 is mounted in the arm 15 in operative relation to the stationary electrode 6. The electrode 16 is grounded through the casing 1 in accordance with the usual practice. The transformer 17, of conventional design, is mounted on the plate 2 within the casing 1. The electrodes 6 and 16 are interposed in the low-voltage secondary circuit of this transformer in the usual manner.

The lever 12 bearing the movable electrode 16 is operated by the power cylinder 18 which has the piston 19 therein; see Figs. 3 and 6. The usual packing cup 20 seals the piston 19 against loss of fluid pressure. The piston rod 21 extends upwardly from the power cylinder 18 and has the crosshead 22 fixed on its upper end.

The interspaced duplex rods 23—23 slidably engage the crosshead 22 and are fixed in the clevis 24 which is pivotally connected to the inner end of the lever 12. The lower ends of the duplex rods 23—23 are guided in the lugs 25 extending laterally from the base 26 of the power cylinder. The springs 27—27 encircle the rods 23 and expand between the crosshead 22 and the clevis 24. These springs resiliently transmit the movements of the piston 19 to the lever 12 carrying the movable electrode 16.

The arms 28—28 extend downwardly from the base 26 of the power cylinder and are pivotally connected to the lever 29 which is fixed on the cross shaft 30. This shaft extends across the casing 1 and is journalled therein. The yoke treadle 31 has its ends fixed to the ends of the shaft 30 by the shackle 32 and is operable to raise the power cylinder 18 and the parts connected therewith as hereinafter described.

The end of the lever 29 rests on the cam 33 which is fixed on the shaft 34 extending longitudinally in the casing 1 and rotatably mounted therein. The cam 33 has the faces 35, 36, 37, 38 (see Fig. 5) disposed at progressively increasing distances from the shaft 34. The shaft 34 may be manually rotated by the lever 39 with the grip 40 thereon to bring any of the cam faces 35—38 into operative position beneath the lever 29. The level of the power cylinder and its associated parts may thus be adjusted for purposes later to be described. The spring 41 contracts between the lug 42 on the clevis 24 and the clip 43 on the casing 1 to urge the piston 19 and the power cylinder 18 to their lowermost position with the end of the lever 29 resting on the cam 33.

The bracket 44 extends laterally from the crosshead 22 and has the standard 45 projecting upwardly therefrom, refer to Figs. 1 and 4. The lever 46 is pivoted at 47 on the standard 45 and has the insulating block 48 fixed thereon. The contact bar 49 is slidably mounted on the pins 50—50 which are fixed on the block 48, and is urged downwardly against the block by the springs 51. The beam 52 is fixed on the bracket 44 and is insulated therefrom, and has mounted therein the two contacts 53—53 which extend upward into juxtaposition with the contact bar 49. The bar 49 and the contacts 53 are connected through the wires 54, 55 to the primary of the transformer 17.

The roller 56 is rotatably mounted in the bifurcated end of the lever 46 and is engaged by the notched end 57 of the link 58 which is pivoted on the lug 42 of the clevis 24. When the machine is in the normal non-operative condition, the springs 27 tend to expand and urge the crosshead 22 away from the clevis 24, thus raising the lever 46 with respect to the bracket 44 and opening the contacts 49—53. The lug 60 on the lever 46 engages the adjustable stop 61 to limit this movement. The downward movement of the lever 46 is limited by the stop 62 fixed on the bracket 44.

The conventional pressure regulator or pressure-stat valve 63 (see Figs. 2 and 6) is mounted on the exterior of the casing 1 and is connected by the pipe 64 to a suitable source of air pressure such as the usual reservoir tank. The pressure delivered at 65 by the valve 63 can be regulated by manually turning the handle 66 and is visually indicated by the gauge 67. The second pressure regulator valve 68 is connected in series with the valve 63 and is set by the manual handle 69 to deliver a lower pressure than the valve 63. The exact pressure to be delivered by the valve 68 is determined as hereinafter described. The needle valve 70 is connected in parallel with the pressure regulator valve 68 and is adapted to bleed air from the region of higher pressure at 65 to the delivery side of the valve 68. The graduated disk 71 is rotatable with the stem of the needle valve 70 and cooperates with the index 72 to indicate the degree of opening of this valve.

The delivery side of the valves 68 and 70 are connected by the pipe 73 to the base 26 of the power cylinder (see Figs. 3 and 6). This base has the vertically disposed chamber 74 therein, the upper end of which communicates with the pipe 73 through the passage 75. The annular valve seat 76 is provided intermediate the length of the chamber 74 and is adapted to be closed by the ball 77. The duct 78 leads from the chamber 74 beneath the ball valve 76—77 and discharges into the power cylinder 18 beneath the piston 19. The chamber 79 in the base 26 communicates with the interior of the cylinder 18 and has the valve seat 80 intermediate its length with the cooperating ball 81. The port 82 discharges from the lower portion of the chamber 79 into the atmosphere.

The plungers 83, 84 are slidable within the base 26 and are adapted to displace the balls 77, 81 from their respective seats 76, 80. The lower ends of these plungers rest on the lever 85 which is pivoted at 86 on the arms 28—28. The spring 87 contracting between the end of the lever 85 and the lug 88 on the base 26 urges the lever 85 into the position shown in Fig. 3 with the plunger 84 pushed upward displacing the ball 81 from its seat 80 and allowing atmospheric pressure to flow to the cylinder 18.

The lever 85 is operated by the solenoid 89 which is mounted on the base 26 and which has the armature 90 which is connected to the lever 85 by the links 91. The solenoid is interposed in an electrical circuit having the source of current 92 and the control switch 93 therein. The switch 93 is preferably of pedal-operated type and remains closed until the foot pressure thereagainst is released.

The invention operates substantially as follows: The two pieces of work to be welded together are manually held between the electrodes 6 and 16, or they may be automatically fed into this position by work feeding means conventional in this art. The pedal switch 93 is then closed. This energizes the solenoid 89 which attracts the armature 90 and swings the lever 85 on its pivot 86. The plunger 84 falls by its own gravity allowing the ball 81 to drop on to its seat 80, cutting the power cylinder 18 from communication with the atmosphere through the chamber 79 and the port 82.

The plunger 83 is raised by the movement of the lever 85 and unseats the ball 77. Compressed air flows from the pipe 73 through the passage 75, past the unseated ball 77, and through the duct 78 into the power chamber 18. This forces the piston 19 upward, raising the cross-head 22, the springs 27, and the clevis 24, and swinging the lever 12 on its pivot 13 to move the electrode 16 toward the stationary electrode 6, clamping the work to be welded between the two electrodes. When the work is thus clamped, the piston 19 and the attached crosshead 22 continue their movement to increase the clamping pressure exerted on the work.

The pivot 47 of the lever 46 moves upward with the crosshead 22, while the latch 58 remains stationary with the clevis 24. This causes the lever 46 to be swung downwardly with respect to the bracket 44, thus bringing the contact bar 49 into engagement with the contacts 53—53 and closing the primary circuit of the transformer 17. Welding current then commences to flow between the electrode 6 and 16 through the work.

The compressed air pressure necessary to compress the springs 27 to carry the operation of the machine to the stage above described is furnished to the power cylinder 18 by the pressure regulator valve 68. This valve is manually adjusted by the handle 69 so that it will deliver only the pressure required to effect this end and no more. The valves 63 and 68 afford a fairly rapid flow of compressed air so that this initial portion of the operation of the machine is accomplished as expeditiously as conditions will permit.

The remainder of the operation of the machine is carried out by means of additional air pressure slowly delivered to the pipe 73 by the needle valve

70. The speed of this second phase of the operation of the machine and consequently the duration of the welding current can be regulated by adjustment of the needle valve 70 to vary the rate at which the compressed air is supplied to the power cylinder 18.

The continued upward movement of the piston 19 further raises the crosshead 22, consequently causing the switch lever 46 to be moved still further downward with respect to the bracket 44 by the stationary latch 58. The yielding of the springs 51 against the bar 49 engaging the contacts 53 enables the movement of the lever 46 relative thereto. The downward movement of the lever 46 is finally checked by its engaging the stop 62. The roller 56 is then compelled to follow the continuing upward movement of the crosshead 22, thus snapping it out of the notched end 57 of the stationary latch 58. The roller 56 engaging the inclined surface 57 of the latch allows the spring 58' to contract and snap the lever 46 upward to open the contacts 49, 53 and cut off the flow of the welding current. The clamping pressure on the work is not relieved when the welding current ceases. The maximum clamping pressure exerted on the work depends upon the air pressure supplied by the pressure regulator valve 63 as indicated by the dial 67. The needle valve 70 bleeds air from the region 65 until the pressure in the power cylinder 18 reaches this maximum value which pressure is then maintained.

After the weld has cooled, the pedal switch 93 is released, de-energizing the solenoid 89. The contraction of the spring 87 then restores the lever 85 into the position shown in Figs. 3 and 6. This allows the ball 77 to drop on to its seat 76 cutting off the cylinder 18 from the supply of compressed air. The plunger 84 is forced inward unseating the ball 81 and thus permitting the compressed air in the cylinder to flow into the atmosphere through the port 82.

As the piston 19 descends, the springs 27 expand while the clevis 24 remains stationary. The switch lever 46 follows the movement of the crosshead 22 until the roller 56 enters the notched end 57 of the stationary latch 58. This limits the expansion of the springs 27 and causes the clevis 24 now to follow the descent of the crosshead 22. The lever 12 is swung on its pivot moving the electrode 16 away from the stationary electrode 6 and releasing the welded work.

The above described automatic operation of the machine is desired when a succession of like welds are to be performed. It occasionally happens that in the midst of such a succession of welds, the work calls for particular welds requiring a longer duration of the welding current. Such a weld can be readily accomplished by the present machine without disconnecting or altering the adjustment of the power mechanism. The work is held between the electrodes 6 and 16 and the foot treadle 31 depressed. This tilts the lever 29 on its pivot 30 and thus raises the power cylinder 18, the piston 19 therein, and all of the parts connected thereto. The lever 12 is swung on its pivot to clamp the work between the electrodes 6 and 16.

The continued movement of the treadle 31 causes the compression of the springs 27. The ensuing relative movement between the roller 56, held by the stationary latch 58, and the bracket 44 causes the closing of the contacts 49 and 53 in the same manner as in the power operation of the machine. After the flow of welding current is started by the closing of the contacts 49, 53, the treadle 31 is depressed at a rate which is commensurate with the time desired for the duration of the flow of current.

The final portion of the movement of the treadle 31 forces the roller to snap out of the notched end of the latch 58 to open the switch contacts 49, 53 as in the power operation earlier described. The release of the treadle lowers the cylinder 18 and restores all the parts to their original position.

The non-operative position of the electrode 16 with respect to the stationary electrode 6 may be adjusted to minimize idle motion in the clamping of work of uniform thickness. This is accomplished by depressing the treadle 31 to raise the lever 29 from engagement with the cam 33. The lever 39 is then manually operated to rotate the cam 33 to bring the appropriate cam face 35, 36, 37, or 38 into operative position with respect to the lever 29.

Having thus described this invention, what we claim and desire to secure by Letters Patent is:

1. A welding machine of the class described comprising a pair of electrodes in operative relation to each other; fluid pressure means for bringing said electrodes together; resilient means interposed between said fluid pressure actuated means and said electrodes and adapted to yield after the work to be welded is clamped between said electrodes by said fluid pressure actuated means; a switch controlling the flow of welding current between said electrodes; means for closing said switch by the yielding of said resilient means to a predetermined extent and for opening said switch after said resilient means further yields to another predetermined extent; a source of fluid pressure connected to said fluid pressure actuated means; a pressure regulator valve interposed between said source of fluid pressure and said fluid pressure actuated means; a second pressure regulator valve interposed between said first pressure regulator valve and said fluid pressure actuated means and adapted to supply fluid pressure sufficient to cause said resilient means to yield sufficiently to close said switch; and by-pass means adapted to provide restricted communication between the fluid pressure line between said pressure regulator valves and said pressure means.

2. A welding machine of the class described comprising a casing; a stationary electrode fixed on said casing; a movable electrode mounted on said casing and in operative relation to said stationary electrode; a power cylinder mounted in said casing; a fluid pressure actuated element associated with said power cylinder; a crosshead mounted on said pressure actuated element; link means operatively connected to said movable electrode; resilient means interposed between said crosshead and said link means; a bracket fixed to said crosshead; a switch contact on said bracket; a lever mounted on said bracket; contact means on said lever in operative relation to said contact on said bracket; a latch mounted on said link member and engaging said lever and arranged to swing said lever to close said switch contact when said resilient means yields to a predetermined extent; and means for disengaging said lever from said latch and opening said switch contact when said resilient means yields to another predetermined extent.

3. A welding machine of the class described comprising a casing; a stationary electrode fixed on said casing; a movable electrode mounted on said casing in operative relation to said stationary electrode; a power cylinder mounted in said casing; a fluid pressure actuated element associated with said power cylinder; means for supplying fluid pressure to said power cylinder; a crosshead fixed on said pressure actuated element; link means operatively connected to said movable electrode; a spring interposed between said crosshead and said link means; a bracket fixed on said crosshead; a switch contact on said bracket; a lever pivoted on said bracket; contact means on said lever in operative relation to said contact on said bracket; a roller on said lever; a latch mounted on said link means and engaging said roller and adapted to swing said lever to close said switch contacts when said interposed spring yields to a predetermined extent; and a stop adapted to limit the movement of said lever after said spring has yielded to another predetermined extent and thereby to move said roller out of engagement with said latch and open said switch contact upon the further yielding of said spring.

FLOYD B. STONE.
HARRY C. STONE.